United States Patent [19]

Madonna

[11] Patent Number: 4,498,870

[45] Date of Patent: Feb. 12, 1985

[54] STIMULUS/RESPONSE DEVICE

[76] Inventor: William J. Madonna, 100 Colette Ct., Oldsmar, Fla. 33557

[21] Appl. No.: 434,260

[22] Filed: Apr. 9, 1984

[51] Int. Cl.³ ............................................... G09B 7/06
[52] U.S. Cl. ................................................... 434/335
[58] Field of Search ............................... 434/335, 338

[56] References Cited

U.S. PATENT DOCUMENTS

| | | | |
|---|---|---|---|
| 1,860,895 | 5/1932 | Marx | 434/338 |
| 3,057,082 | 10/1962 | Wellington et al. | 434/338 |
| 3,070,904 | 1/1963 | Saba | 434/338 |
| 3,562,922 | 2/1971 | Friedman et al. | 434/335 |
| 3,596,373 | 8/1971 | Morgan | 434/338 |
| 3,634,950 | 1/1972 | McKay | 434/335 |
| 3,809,784 | 5/1974 | Munafo | 434/335 |
| 3,964,177 | 6/1976 | Wright | 434/338 |

*Primary Examiner*—William H. Grieb
*Attorney, Agent, or Firm*—Ronald E. Smith

[57] ABSTRACT

A device that produces a first response when its operator has successfully matched a pair of specific stimuli from a plurality of stimuli available for matching, and a second response when the selected stimuli are not a match. The stimuli available for matching are grouped into two (2) separate and distinct groupings, and one of said groupings is sub-divided into a plurality of sets. Both groups of stimuli are encoded in BCD form. All of the sets in said sub-divided group of stimuli are stored in the memory of a PROM, and a selector switch re-calls a specific one of the sets from the memory of the PROM when it is desired to attempt to match the stimuli in such selected set with stimuli from the first, unsub-divided group of stimuli. A comparator means performs the matching function to determine whether the device operator has successfully matched the stimuli from the first and second groups.

7 Claims, 5 Drawing Figures

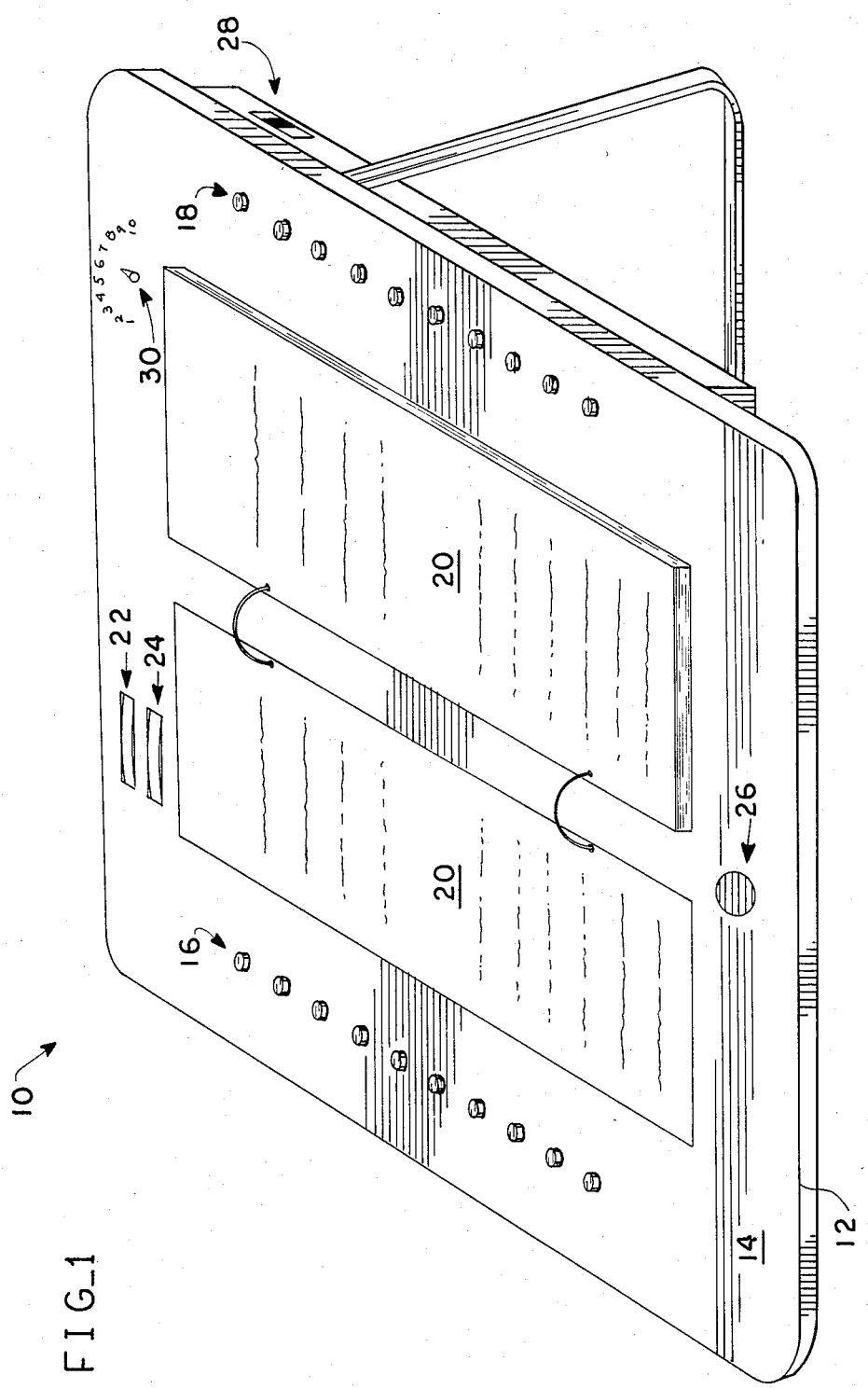
FIG_1

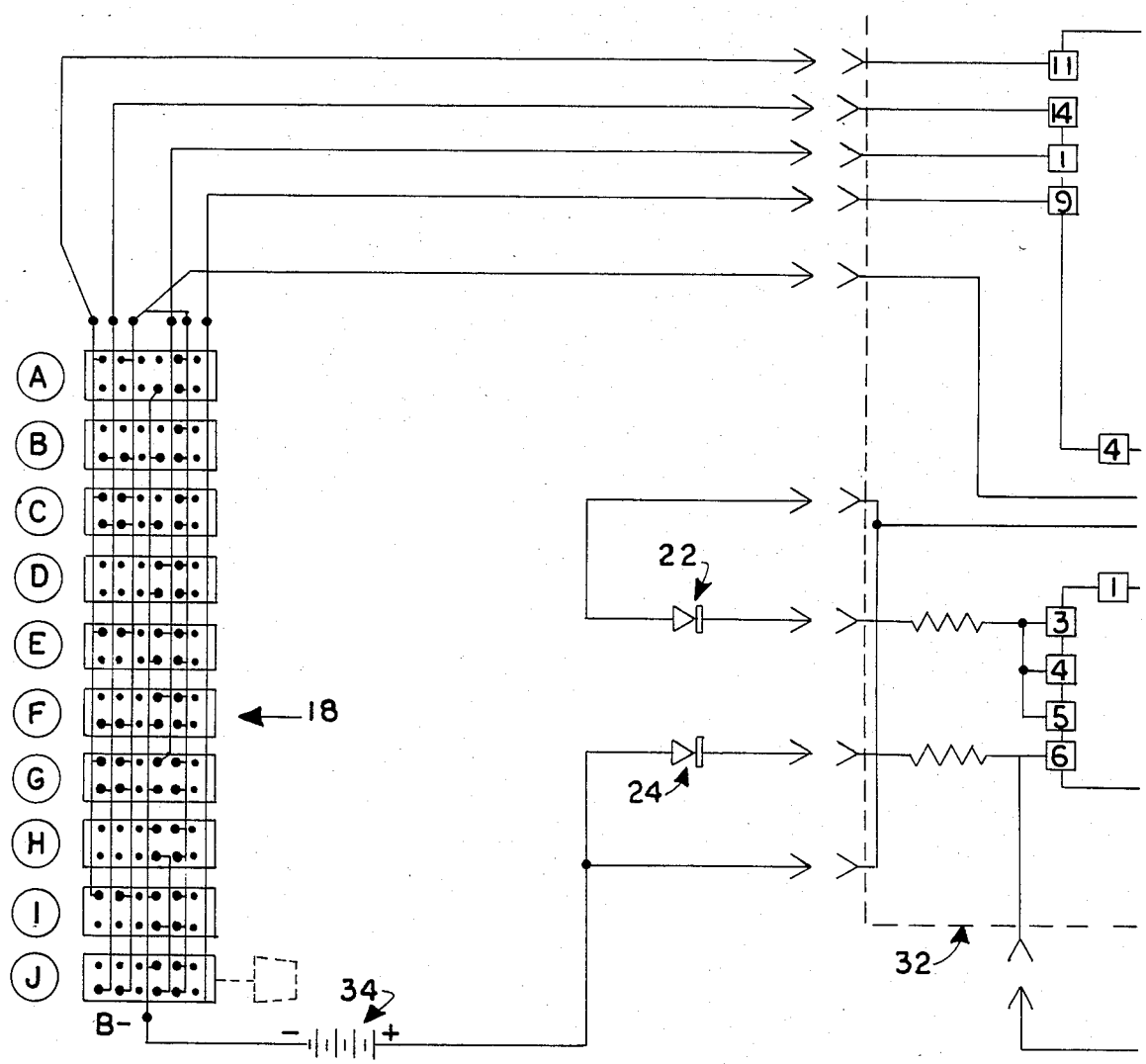
FIG_2A

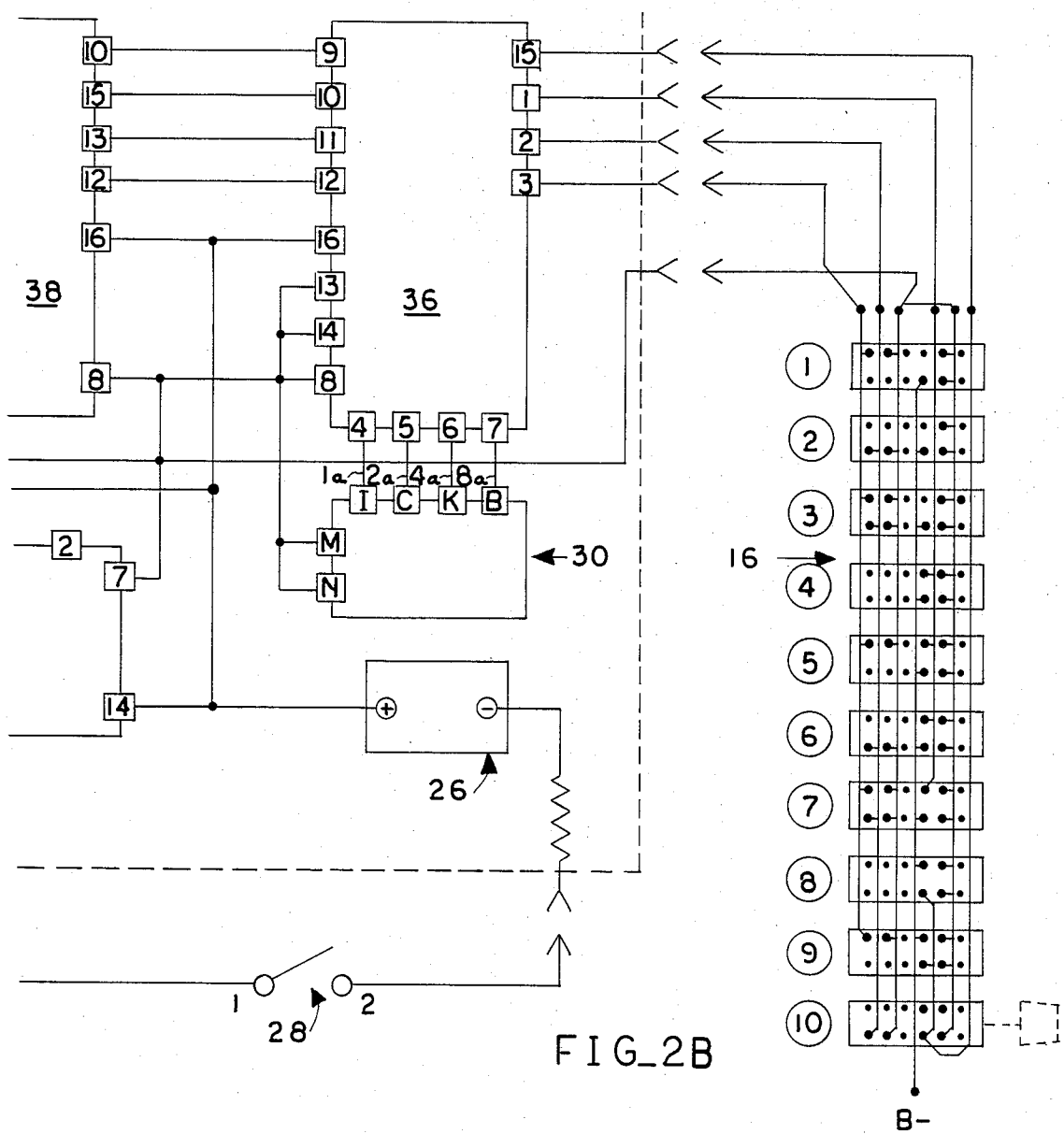
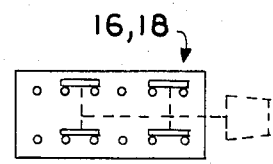
FIG_3A
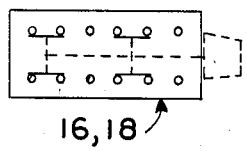
FIG_3B

STIMULUS/RESPONSE DEVICE

BACKGROUND OF THE INVENTION

1. Field of the Invention

This invention relates, generally, to stimulus/response devices, and more specifically to such a device having utility in the educational or game context.

2. Description of the Prior Art

Although stimulus/response machines are well known, such devices have heretofore taken the form of electro-mechanical constructions characterized by a multiplicity of wired connections and by relatively cumbersome circuit-scrambling structures. Circuit-scrambling is highly desireable in the context of stimulus/response devices, because in the absence thereof the operator of such devices can learn the wiring pattern of the device, commit the same to memory, and thereby lose the education-enhancing effect of operating such a device.

More specifically, if an operator notices that a successful matching of stimuli always occurs when stimulus number 8, for example, from a first group of stimuli, is matched with stimulus number 3, for example, from a second group of stimuli, then the educational value of the device is short-circuited, so to speak. More particularly, a first group of stimuli may represent a first group of questions, and a second group of stimuli may represent a group of possible answers corresponding thereto. If no circuit scrambling is provided whenever a new group of questions is propounded, the operator of the device can correctly answer the new questions by simply remembering the physical location of the answer to the questions as previously numbered, without regard to the content of the question.

A need exists, however, for a device that scrambles the circuit connections between differing sets of questions and answers in the absence of cumbersome and expensive electro-mechanical devices. The preferred form of an ideal device would incorporate the advantages inherent in digital devices because such devices are inexpensive, require low power, and have the all-important capacity to store and retrieve virtually unlimited amounts of questions and answers, or stimuli and responses thereto of any form. An inventive use of digital devices could provide a means whereby the desired circuit scrambling could be accomplished in the absence of the jumbled electrical conductors which plague the devices of the prior art, and could provide means for performing the desired matching of stimuli at a very low cost.

The needed device does not appear in the prior art.

SUMMARY OF THE INVENTION

The longstanding but heretofore unfulfilled need for an educational device of the type that overcomes the limitations of the prior art is now provided in the form of a device having means for representing questions and answers, or other stimuli and corresponding responses, in the form of encoded signals which represent decimal numbers in binary form. The device operator first selects a set of questions from a group of available questions. For example, the operator may desire to test his or her knowledge of digital devices. A booklet provided with the inventive device might indicate that questions and answers concerning digital devices are stored in the memory of the device under the heading "8". The operator simply points a selector switch at the number 8 by conventional analog means, and the inventive device converts the decimal "8" into its binary form. The binary form of the decimal number "8" is transmitted into the memory device, thereby causing the memory device to re-call the set of questions corresponding to the number "8" in binary form. The operator then selects any one of the available questions, depresses a button adjacent thereto, and attempts to depress another button associated with the correct answer. The depression of the second button transmits a decimal number in binary form to a comparator, whereas the depression of the first button transmits a decimal number in binary form from the memory means to the comparator. The comparator subtracts one BCD from the other and gives a response indicating a successful match only if the difference between the compared numbers is zero (0). If the difference therebetween is any positive or negative value, indicating that the BCDs are unequal, a different response is then generated, signifying the absence of a match.

It is therefore understood that an important object of the invention is to provide a digital stimulus/response device so that a large number of stimuli to be matched may be stored therein, re-called easily in sets, and matched in the absence of mechanical circuit-scrambling means.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 1 is a perspective view of a device made in accordance with the teachings of this invention, illustrating one of the many forms that the invention may take.

FIGS. 2A and 2B are a schematic representation of the circuitry that accomplishes the logical functions of the device, such circuitry being illustrative of the concept underlying the invention.

FIG. 3A is a diagrammatic representation of a push button switch employed in the context of the invention, showing the button in its non-depressed, normally open position.

FIG. 3B is a diagrammatic representation of the button of FIG. 3A in its depressed or activated position.

DETAILED DESCRIPTION OF THE PREFERRED EMBODIMENT

Referring now to FIG. 1, it will there be seen that a game apparatus that illustratively embodies the inventive concept is designated by the reference numeral 10 as a whole. The apparatus 10 includes upstanding sidewalls 12 and top wall 14 which is suitably apertured to accommodate two (2) columns of vertically spaced depressable button means, indicated collectively by the reference numerals 16, 18. Buttons 16, 18 are two-position (up/down) switches and are normally in their undepressed configuration, buttons 16 having an interlock so that an individual button remains in its depressed configuration until it is reset, whereas buttons 18 are of the momentary type, being biased in the upwardly direction so as to return to such undepressed configuration when pressure is released therefrom.

In the embodiment of FIG. 1, buttons 16 are associated with correspondingly numbered questions in a booklet 20 that is releasably secured to the top wall 14. Buttons 18 are associated with correspondingly numbered answers appearing in the same booklet 20.

A green LED 22 and a red LED 24 are mounted in registration with viewing apertures formed in the top wall 14, and adapted to emit light of their respective colors responsive to a correct matching of questions and answers, and an incorrect matching, respectively. A buzzer means 26 may also be provided and wired to respond to either correct or incorrect answers. Switch 28 is thrown to either activate or deactivate the buzzer feature.

A pivotally mounted selector switch means 30 is further provided in conjunction with the numerals 1-10 arrayed in arcuate configuration adjacent thereto so that the user of the apparatus 10 can select a plurality of sets of questions, which plurality in the example shown is ten (10).

In the embodiment under discussion, the booklet 20 has ten (10) pages of ten (10) questions and answers, on ten (10) differing subject matters. The invention is not limited to such an illustrative embodiment, however, as will become more clear as this description proceeds. Specifically, the inventive circuitry shown in FIG. 2 and equivalent circuits can be employed in conjunction with a booklet 20 having a much greater length than ten (10) pages of ten (10) questions each. The limitation herein to one hundred (100) questions is simply for convenience purposes only.

It is convenient to disclose the invention in terms of ten (10) questions per set of questions because, as is well known, the decimal numbers 1-15 can be represented in binary form with only four (4) bits of information, whereas larger numbers (sixteen (16) and up) require at least a fifth bit of information. The binary equivalent of the decimal numbers 1-10 is reproduced as follows, so that reference to the same may be made by those desiring to decode the electrical connections made between the buttons 16, 18, and the balance of the inventive parts:

| | |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |
| 10 | 1010 |

As seen in FIG. 2, the answer buttons 18 are on the left of the drawing, and the question buttons 16 are on the right thereof. A printed circuit board 32 is represented by the phantom lines appearing in FIG. 2, and the physical interconnections of such PCB and the balance of the inventive circuitry are represented by sixteen (16) pairs of longitudinally spaced, axially aligned arrow heads.

It will be observed that four (4) lines emanate from the respective groups of buttons, 16, 18, said lines being numbered 1, 2, 4 and 8 in both instances, since the number two (2) raised to the zeroth (0th), first (1st), second (2nd), and third (3rd) powers, respectively, is 1, 2, 4 and 8.

FIG. 3A shows an individual, undepressed button in diagrammatic fashion, whereas FIG. 3B shows such button in its depressed configuration. With reference to FIG. 3B, it is clear that when the button has been pressed, an electrical circuit is completed from the six (6) volt DC battery means 34, through the lines 1, 2, 4 and 8, and to ground through the active components to be described hereinafter.

The active components will be described in conjunction with the following description of the operation of the device from the operator's point of view.

After opening booklet 20 to the desired pages which contain questions and answers concerning a topic of interest to the operator, the operator will first position the selector dial so that it is pointing toward the decimal number corresponding to the set of questions and answers that has been selected by such operator. The booklet 20 of course identifies each given set of questions and answers by a decimal number for this purpose. Suppose the operator selects group of questions number 7. He or she turns the selector dial 30 to point to the numeral 7 adjacent the dial 30. Since the decimal number 7 is represented in binary form as 0111 (0+4+2+1), when the dial 30 has been pointed at the decimal number 7, a voltage will appear on the lines indicated by the reference numerals 1a, 2a, and 4a, there be no voltage on line 8a in this example. Thus, the selector 30 is seen to be a BCD encoded switch, having the same decimal-to-BCD capability as the buttons 16, 18.

The lines 1a, 2a, 4a and 8a are electrically connected to a Programmable Read Only Memory means (PROM). In the example under discussion, only ten (10) sets of ten (10) questions each are being used. Thus, all of the questions can be stored in the form of one hundred (100) four (4) bit words. The PROM shown, however, has the capacity to store two hundred fifty six (256) 4 bit words, and could thus be used in a more expanded version of the invention. Moreover, PROMs of even greater capacity are available, and the use of such PROMs is also clearly within the scope of this invention.

Since all one hundred (100) of the required four (4) bit words are stored in the PROM, selection of a given group of ten (10) questions by turning the dial 30 causes the PROM to re-call from memory only the selected group. The ten (10) questions thereby recalled will be in BCD form, and will be in a predetermined random ordering. For example, question one (1) may be represented by the four (4) bit word 0011 (3), question two (2) by 1001 (9), and so on. The operator, of course, is unable to see or otherwise ascertain such encoded "words", and can correctly answer the question represented by such word only by pressing the correct answer button 18. When the operator completes question group seven (7) and turns the dial 30 to another setting, the order of questions will be a different order than the order of group seven (7), and so on. Thus, the scrambling of questions internally of the PROM 36 is accomplished when the PROM is programmed in the normal fuse-destroying manner.

It is important to note that the answers need not be scrambled in any way other than the scrambling thereof in the booklet 20. (Question 1 cannot always be answered by answer 6, etc.) Since the questions are stored in the PROM in ten (10) separate and distinct groupings and share no common order, all of the needed scrambling is accomplished at the time of programming, as aforesaid.

In further clarification of this point, suppose the questions of group five (5) are arranged in the PROM as follows:

| Question No. | BCD |
|---|---|
| 1 | 1000 |
| 2 | 0110 |
| 3 | 1010 |
| 4 | 0001 |
| 5 | 1001 |
| 6 | 0010 |
| 7 | 0111 |
| 8 | 0011 |
| 9 | 0100 |
| 10 | 0101 |

The operator, as aforesaid, will be unable to determine that the answer to question number 1 is answer number 8, and so on. The next position of the selector dial 30 will cause the PROM to call the another group of four (4) bit words, in an order unrelated to the order appearing above, for example.

In view of the scrambling of the questions, there is no need to scramble the answers. A comparator means 38 is wired as shown to receive the answers selected by the game operator over lines 1, 2, 4, 8 from the buttons 18, said answers being of course encoded in BCD form, as aforesaid. The operator, having called a particular group of questions from the memory of the PROM by dialing the selector switch 30, transmits a selected question from such group by depressing the appropriate button 16. A four (4) bit word will appear on lines 1, 2, 4 and 8 from such buttons 16 and will trigger the PROM 36 to transmit such word to the comparator 38. The operator now presses the button 18 he or she believes to represent the correct answer to the selected question. The comparator will subtract one of the four (4) bit words from the other and create a ground at one of its pins to allow current flow through the green LED to indicate a correct answer only if the difference between the two (2) encoded numbers is zero (0). Any positive or negative number resulting from the subtraction will indicate that no match has occured, and another appropriate pin of the comparator 38 will go to ground to permit current flow through the red LED and, if connected, through the buzzer means 26.

In this manner, a highly flexible and unpredictable means is provided for challenging one's knowledge skills. The synergistic effect of the combination of the PROM, the selector dial, the comparator, and the encoded signals from the question and answer buttons provides all of the desired features of an improved stimulus/response device with a minimum of active components and an irreducible minimum of electrical connections and conductors.

The following is a list that more fully identifies the parts employed herein, it being understood that equivalent parts may be substituted therefor in keeping with the teachings of this invention:

| Part | Description |
|---|---|
| Comparator | SN 7485 N |
| PROM | HMS-7611-5 (Harris) |
| Selector switch | Any BCD encoded switch |
| NAND Gate (Driver) | SN 7403 N |
| Green LED resistor | 120 Ohms |

| Part | Description |
|---|---|
| Red LED resistor | 330 Ohms |

It will thus be seen that the objects set forth above, and those made apparent by the preceding description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
That which is claimed is:

1. A device that provides a plurality of responses to a plurality of stimuli, wherein at least one preselected specific response is provided only when the operator of the device successfully matches a specific pair of said plurality of stimuli, and wherein said plurality of stimuli are divided into a first and second group of stimuli, said second group being subdivided into a plurality of sets of stimuli, the ordered arrangement of which differs as between different sets, so that a successful matching of a stimulus from said first group with a stimulus from a selected set of stimuli from said second group does not indicate to said operator how to make successive matches, wherein the improvement comprises, in combination, a first generating means for generating a first plurality of encoded signals, each of which first encoded signals represents a specific stimulus included in said first group of stimuli, a second generating means for generating a second plurality of encoded signals, each of which second encoded signals represents a specific stimulus included in said second group of stimuli, said first generating means being selectively operable to generate specific ones of said first plurality of encoded signals, said second generating means being selectively operable to generate specific ones of said second plurality of encoded signals, a memory means for storing all of the stimuli contained in said second group of stimuli, a selector means having as many positions as there are sets of stimuli in said second group of stimuli for re-calling from said memory means a specific set of stimuli from said second group of stimuli so that different sets of stimuli are re-called by each position of said selector means, a comparison means operatively connected to said second generating means, and to said memory means, said memory means adapted to transmit a first specific stimulus from a selected set of stimuli from said second group of stimuli to said comparison means responsive to selection by said operator of said first specific stimulus, said first generating means adapted to transmit a second specific stimulus from said first group of stimuli to said comparison means responsive to selection by said operator of said second specific stimulus, said comparison means providing a first response when said first specific stimulus matches said second specific stimulus, and providing a second response when said first specific stimulus does not match said second specific stimulus.

2. The device of claim 1, wherein said first and second generating means comprise a plurality of decimal to binary coded decimal code converters.

3. The device of claim 1, wherein said selector means comprises a decimal to binary decimal code switching means.

4. The device of claim 1, wherein said memory means comprises a Read Only Memory means.

5. The device of claim 1, wherein said memory means comprises a Programmable Read Only Memory means.

6. The device of claim 1, wherein said comparison means comprises a comparator means logic device that performs a subtraction of said first and second specific stimuli generated by said first and second generating means and provides a first specific response when the difference therebetween is zero (0), and a second specific response when the difference therebetween is a value other than zero (0).

7. The device of claim 1, wherein said first and second group of stimuli represent answers and questions, respectively, said second group of questions being subdivided into a plurality of sets of questions, there being as many sets of questions as there are answers in said first group of stimuli, and all of said sets of question being stored in said memory means and recallable therefrom in sets so that each set is matchable with said first group of answers.

* * * * *